(12) United States Patent
Williamson et al.

(10) Patent No.: US 8,191,077 B2
(45) Date of Patent: *May 29, 2012

(54) METHOD FOR PROVIDING STAND-IN OBJECTS

(75) Inventors: Richard Williamson, San Francisco, CA (US); Linus Upson, Half Moon Bay, CA (US); Dan Willhite, San Francsico, CA (US); Jack Greenfield, Reston, CA (US)

(73) Assignee: NeXT Software, Inc., Cupertino, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/414,444

(22) Filed: Mar. 30, 2009

(65) Prior Publication Data
US 2009/0187921 A1    Jul. 23, 2009

Related U.S. Application Data

(63) Continuation of application No. 11/497,556, filed on Jul. 31, 2006, now Pat. No. 7,539,997, which is a continuation of application No. 11/233,802, filed on Sep. 23, 2005, now Pat. No. 7,523,458, which is a continuation of application No. 10/237,141, filed on Sep. 5, 2002, now Pat. No. 6,952,706, which is a continuation of application No. 09/776,243, filed on Feb. 2, 2001, now Pat. No. 6,466,992, which is a continuation of application No. 08/831,634, filed on Apr. 8, 1997, now Pat. No. 6,223,227, which is a continuation of application No. 08/353,523, filed on Dec. 7, 1994, now abandoned.

(51) Int. Cl.
G06F 3/00 (2006.01)
G06F 9/00 (2006.01)
(52) U.S. Cl. .................................. 719/313; 719/316
(58) Field of Classification Search .................. None
See application file for complete search history.

(56) References Cited

U.S. PATENT DOCUMENTS 5,708,811 A * 1/1998 Arendt et al. ................. 717/163

* cited by examiner

Primary Examiner — Qing Wu
(74) Attorney, Agent, or Firm — Van Pelt, Yi & James LLP

(57) ABSTRACT

A method for providing stand-in objects, where relationships among objects are automatically resolved in an object oriented relational database model without the necessity of retrieving data from the database until it is needed. A "fault" class is defined, as well as fault objects whose data haven't yet been fetched from the database. An object that's created for the destination of a relationship whenever an object that includes the relationship is fetched from the database. When an object is fetched that has relationships, fault objects are created to "stand-in" for the destination objects of those relationships. Fault objects transform themselves into the actual enterprise objects—and fetch their data—the first time they're accessed. Subsequently, messages sent to the target objects are responded to by the objects themselves.

20 Claims, 9 Drawing Sheets

METHOD FOR PROVIDING STAND-IN OBJECTS

This application is a continuation of U.S. patent application Ser. No. 11/497,556 filed Jul. 31, 2006, now U.S. Pat. No. 7,539,997, which is a continuation of U.S. patent application Ser. No. 11/233,802 filed Sep. 23, 2005, now U.S. Pat. No. 7,523,458, which is a continuation of U.S. patent application Ser. No. 10/237,141 filed Sep. 5, 2002, now U.S. Pat. No. 6,952,706, which is a continuation of U.S. patent application Ser. No. 09/776,243 filed Feb. 2, 2001, now U.S. Pat. No. 6,466,992, which is a continuation of U.S. patent application Ser. No. 08/831,634 filed Apr. 8, 1997, now U.S. Pat. No. 6,223,227, which is a continuation of U.S. patent application Ser. No. 08/353,523 filed Dec. 7, 1994, now abandoned, the specification and figures of each of which are herein incorporated by reference.

BACKGROUND OF THE PRESENT INVENTION

1. Field of the Invention

This invention relates to the field of object-oriented programming. Specifically, it relates to a method of providing stand-in objects in an object-oriented programming environment.

2. Background Art

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation." In object-oriented programming, operations that can be performed on the data are referred to as "methods."

An object can be instructed to perform one of its methods when it receives a "message." A message is a command or instruction to the object to execute a certain method. It consists of a method selection (name) and arguments that are sent to an object. A message tells the receiving object what to do.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are generally based on one of two schemes for representing general concepts and sharing knowledge. One scheme is known as the "class" scheme. The other scheme is known as the "prototype" scheme. Both the class-based and prototype-based object-oriented programming schemes are generally described in Lieberman, "Using Prototypical Objects to Implement Shared Behavior in Object-Oriented Systems," OOPSLA 86 Proceedings, September 1986, pp. 214-223.

Class Scheme

An object that describes behavior is called a "class." Objects that acquire a behavior and that have states are called "instances." Thus, in the Objective C language, which is the computer language in which the preferred embodiment of the present invention may be implemented, a class is a particular type of object. In Objective C, any object that is not a class object is said to be an instance of its class. The classes form a "hierarchy." Each subclass in the hierarchy may add to or modify the behavior specified by its parent class and may also add additional states.

An object in Objective C may couple its data with the methods for operating on that data. However, when the data for an object is part of a relational database, the relationships among the stored data may also be retrieved, or "fetched." For example, in an relational database where both Employee and Department information is stored, the Employee and Department information may be related (e.g., have a related column or columns). In such a case, once Employee data is retrieved to instantiate an Employee object, a corresponding Department object is also created and instantiated with data from the database that is related to the data from the Employee object. This process of instantiating a Department object with the data related to the instantiated Employee object is referred to as resolving the relationship between the Employee and Department objects.

If a fetched object has many relationships that are to be resolved when the object is fetched, system resources (e.g., processing time and memory) are consumed during the fetch operation to resolve the relationships. For example, an object is fetched that has relationships with other objects in the database and these other objects have relationships with still other objects in the database, a fetch operation is performed for each related object. For example, an Employee object may have relationships with objects such as Department, Employee ID, Salary, Start Date, Vacation Days, Sick Days, Health Benefits and Office. Fetching of the Employee object causes a fetch of all of these objects, as well as the data to fill these objects. Also, any objects related to these objects are also retrieved, causing unnecessary interaction with the database server, and significantly increasing processing time and memory requirements. When all of an object's relationships are resolved regardless of whether a related object is needed, the processing time and memory requirements expended to resolve the relationships is wasted.

One prior art solution is to create an intermediate object called a "handle." The handle acts as a "go-between' and is used to reference objects related to a fetched object. For example, after the Employee object is fetched, the handle for the related Department object is created instead of the actual Department object. The handle may take any of various forms, such as a pointer to a pointer, a function call, a name look-up in a dictionary, or a method on some object. When code in the Employee object wishes to access the Department object, it must ask the handle for the information. The first time the Department object is accessed, the Department object is instantiated and stored in memory.

One disadvantage of this prior art method is that the program must always direct messages and inquiries to the Department object through the Department handle. The Employee object does not have direct access to the Department object or the Department data. Thus, an extra level of interaction and complexity to the code is created. Since not all objects get handles, different code must be written to interact with objects that have handles (e.g., the Department object) than to interact with regular objects without handles. Further, objects with handles look and behave differently than all other objects in the programming environment. Existing function libraries or other pieces of code written to manipulate regular objects will not work with handles because they expect to interact with the objects directly. Consequently, duplicate algorithms must then be written to interact with both handles and regular objects.

Another prior art method for dealing with this problem involves using the virtual memory system of the computer. In this scheme, when a pointer to a particular object is referenced, the virtual memory page faulting mechanism determines which page of memory contains the referenced object, and then retrieves the entire page. For example, when the Employee object wishes to access the Department object, a page fault is invoked, and the page of memory that contains the Department object is retrieved.

One disadvantage of this prior art scheme is that it is dependent on the virtual memory and API constraints of the virtual memory system of the computer system. Another disadvantage of this scheme is that more information is retrieved than is necessary, since an entire page of memory is retrieved for a reference to a single object. That is, for example, every object whose virtual address is contained in the page retrieved must be retrieved regardless of whether the object is actually needed. Further, a virtual memory system must be modified to access data from a conventional database system. For example, there must be some means for associated a virtual address of a referenced object and the data that must be fetched from the database to instantiate the object. When a page fault occurs, for example, the rowid of each row containing data for the objects whose virtual addresses are contained in the page must be determined and then used to fetch the data from the database to instantiate each object.

Thus, a flexible method for providing object fetching with reduced database server interaction and simplified code requirements is desired.

SUMMARY OF THE INVENTION

The present invention provides a method for delaying the instantiation of an object in an object-oriented environment. Instead of creating an actual object, a stand-in object is created. When an actual object is instantiated, a description is referenced to locate the data from a data source that is used to populate the actual object. The present invention can be used with any data source including a user interface, a file system, a database, and an object-oriented database, for example.

One application of the present invention provides a method for automatically resolving the relationships defined in an object oriented relational database model without the necessity of retrieving data from the database until it is needed. A "fault" class is defined, as well as fault objects whose data haven't yet been fetched from the database. An object that's created for the destination of a relationship whenever an object that includes the relationship is fetched from the database. When an object is fetched that has relationships, fault objects are created to "stand-in" for the destination objects of those relationships. Fault objects transform themselves into the actual objects—and fetch their data—the first time they're accessed.

This delayed resolution of relationships occurs in two stages: the creation of a placeholder object for the data to be fetched, and the fetching of that data only when it's needed.

A fault object behaves in every way possible as an instance of its target class until it receives a message it can't cover for. For example, if you send a class message to this fault object, it returns the Employee class. If you send the fault object a message requesting the value of an attribute, such as lastname, however, it uses the database channel that created it to retrieve its data from the database, overwrites its class identity, and invokes the target class's implementation of lastName.

By not fetching an object until the application actually needs it, unnecessary interaction with the database server is therefore prevented.

DETAILED DESCRIPTION OF THE INVENTION

A method for providing stand-in objects is described. In the following description, numerous specific details are set forth in detail in order to provide a more thorough understanding of the present invention. It will be apparent, however, to one skilled in the art, that the present invention may be practiced without these specific details. In other instances, well known features have not been described in detail so as not to obscure the present invention.

Computer System

Figure 4:
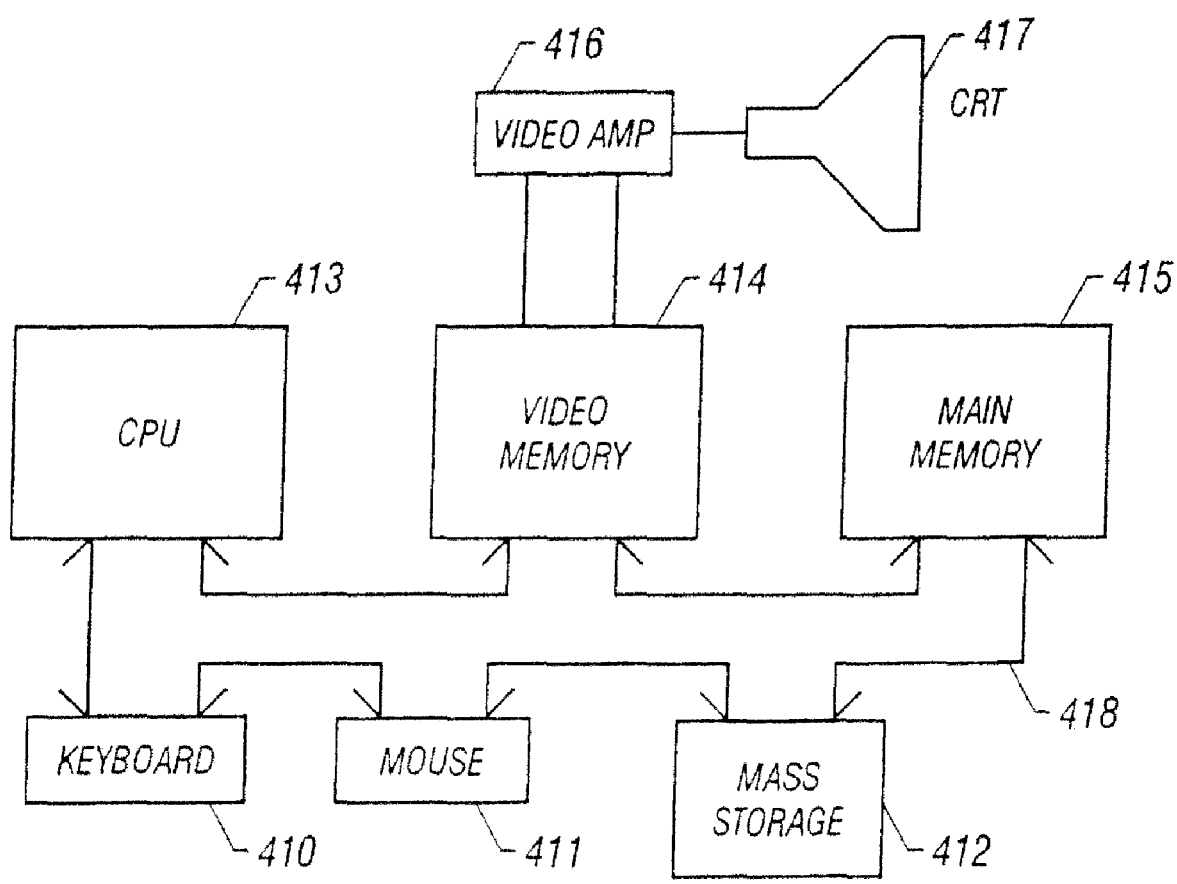
FIG. 4 is a block diagram illustrating a general purpose computer system for implementing the present invention.

The present invention may be implemented on any conventional or general purpose computer system. An example of one embodiment of a computer system for implementing this invention is illustrated in FIG. 4. A keyboard 410 and mouse 411 are coupled to a bi-directional system bus 418. The keyboard and mouse are for introducing user input to the computer system and communicating that user input to CPU 413. The computer system of FIG. 4 also includes a video memory 414, main memory 415 and mass storage 412, all coupled to bi-directional system bus 418 along with keyboard 410, mouse 411 and CPU 413. The mass storage 412 may include both fixed and removable media, such as magnetic, optical or magnetic optical storage systems or any other available mass storage technology. The mass storage may be shared on a network, or it may be dedicated mass storage. Bus 418 may contain, for example, 32 address lines for addressing video memory 414 or main memory 415. The system bus 418 also includes, for example, a 32-bit data bus for transferring data between and among the components, such as CPU 413, main memory 415, video memory 414 and mass storage 412. Alternatively, multiplex data/address lines may be used instead of separate data and address lines. The computer system shown in FIG. 4 further includes a video amp 416 and CRT 417.

The computer system described above is for purposes of example only. The present invention may be implemented in any type of computer system or programming or processing environment.

Programming System

The preferred embodiment of the present invention implements an object-oriented programming system using Objective C language. Objective C is an extension to ANSI C that supports the definition of classes of objects and provides syntactic and run-time support for sending messages to objects. This language model is partially derived from SmallTalk and has been described in "Object-Oriented Programming; An Evolutionary Approach," Brad J. Cox, Addison-Wesley 1986 and in "SmallTalk-80: The Language and its Implementation," Adele Goldberg, Dave Robson, Addison-Wesley 1983.

One feature of Objective C is "dynamic binding" of messages to the actual methods to be invoked, depending on the class of the receiver. A programmer writing code in Objective C can create code that sends a message "doSomething" to an object. The actual method corresponding to the class of the target object does not need to be determined until the message must be sent. This allows objects of any classes that implement the doSomething method to be substituted for the target object at run time without having to modify the part of the program that sends the message. Also, in Objective C, programs have run time access to method "signatures," that encode a method's argument and return types for each class. The method signature provides a way for two programs to agree on the format of messages.

The implementation of the present invention is preferably used in an object oriented programming system having the ability to catch messages that are not recognized by a receiver object whenever that particular method is not implemented on that class.

When an object is sent a message, and the run time system cannot find an implementation of the method for the receiving object, the run time system sends the object a forward message to give it an opportunity to delegate the message to another object or raise an error. If the forwardee object cannot respond to the message either, it also has the opportunity to forward the message. A forward message is generated only if a method is not implemented by the receiving object's class or by any of the classes it inherits from.

An example of one such forwarding method is described in U.S. patent application Ser. No. 07/695,316, filed on May 3, 1991, entitled "METHOD FOR PROVIDING AUTOMATIC FORWARDING OF MESSAGES AND METHODS" and assigned to the assignee of the present invention.

Enterprise Objects

Although the present invention may be used with any objects, one embodiment of the present invention uses "enterprise" objects. An enterprise object is an Objective C object that conforms to the key-value coding protocol, whose properties (data) can map to stored data. An enterprise object brings together stored data with the methods for operating on that data. An enterprise object is like any other Objective C object, in that it couples data with the methods for operating on that data. However, an enterprise object class has certain characteristics that distinguish it from other Objective C classes:

- It has properties that map to data outside the current process (e.g., stored data); an enterprise object instance typically corresponds to a single row or record in a database.
- It includes behavior to give and receive values for its properties.

The ingredients that make up an enterprise object are its class definition and the data values from the database row or record with which the object is instantiated. If the data store is a relational database, a third ingredient in an enterprise object is the model that defines the mapping between the class's object model and the database schema.

Delayed Resolution of Relationships

The present invention automatically resolves the relationships defined in a model (See "Models" description below), by delaying the actual retrieval of data—and communication with the database—until the data is needed. This delayed resolution of relationships occurs in two stages: the creation of a placeholder object for the data to be fetched, and the fetching of that data only when it's needed.

When the run time environment fetches an object, it examines the relationships defined in the model and creates objects representing the destinations of the fetched object's relationships. The present invention doesn't immediately fetch data for the destination objects of relationships, however. Fetching is fairly expensive, and further, if the run time environment fetched objects related to the one explicitly asked for, it would also have to fetch the objects related to those, and so on, until all of the interrelated rows in the database had been retrieved.

To avoid this waste of time and resources, the destination objects created are stand-ins of a special class whose instances transform themselves into actual objects—and fetch their data—the first time they're accessed. These stand-ins are called fault objects, and come in two varieties: single-object faults for to-one relationships, and array faults for to-many relationships.

A "to-many relationship" is a relationship in which each source record has zero to many corresponding destination records. For example, a department has many employees. A "to-one relationship' is a relationship in which each source record has exactly one corresponding destination record. For example, each employee has one job title.

A fault object occupies the same amount of memory as an instance of the target class (which it's eventually transformed into), and stores the information needed to retrieve the data associated with the fault (the values of the keys defining the relationship for a single-object fault, a qualifier describing objects for an array fault). A fault object thus consumes some memory in an application, but usually does not consume more resources than a near-empty instance of its target class.

A fault object behaves in every way possible as an instance of its target class until it receives a message it can't cover for. For example, if the application fetches an Employee object and then asks for its manager, it receives a fault object representing another Employee object. If a class message is sent to this fault object, it returns the Employee class. If you send the fault object a message requesting the value of an attribute, such as lastName, however, it retrieves its data from the database, overwrites its class identity, and invokes the target class's implementation of lastName.

Figure 1A:
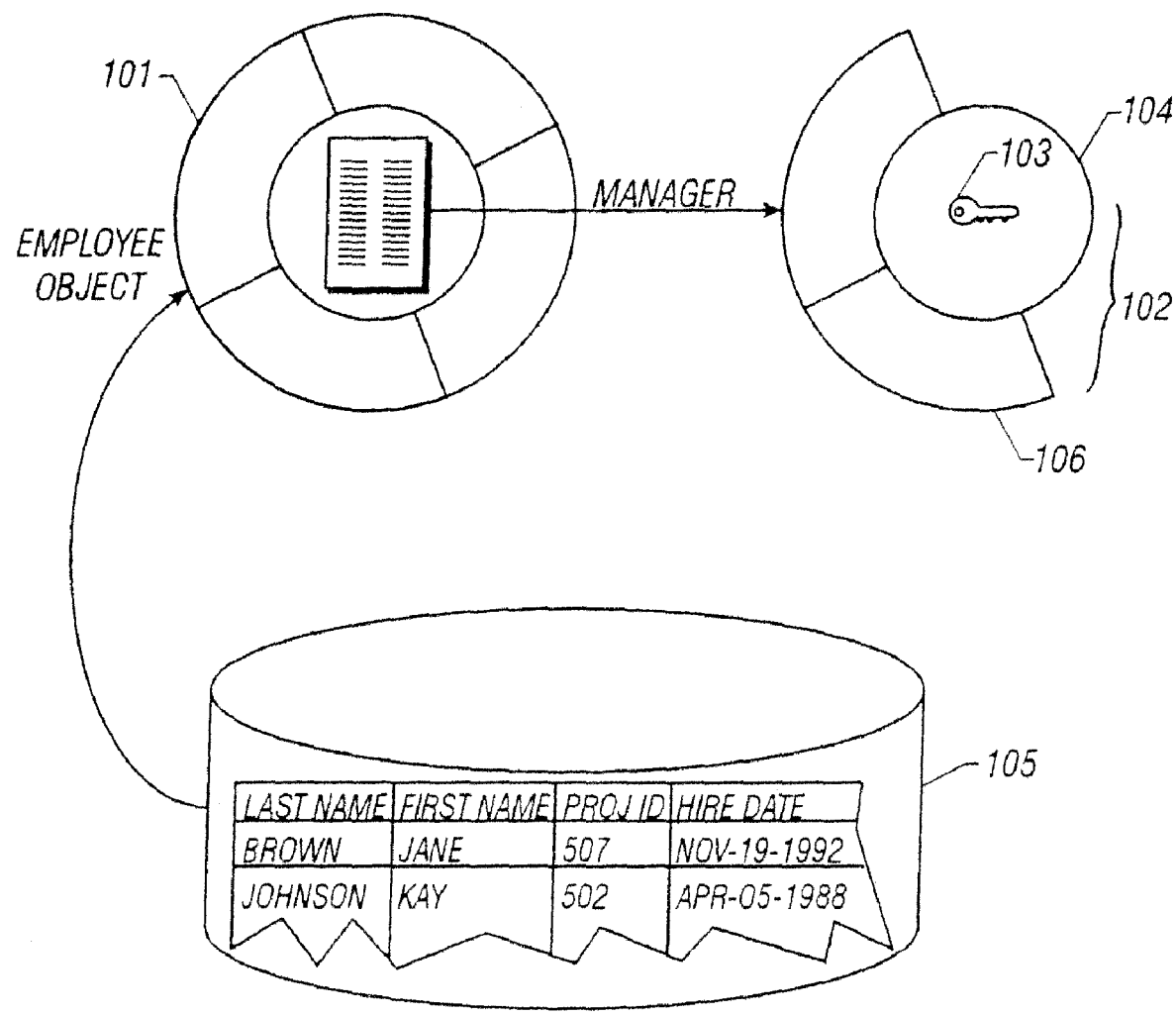
FIGS. 1A, 1B and 1C are illustrations showing one embodiment of the present invention.
Figure 1B:
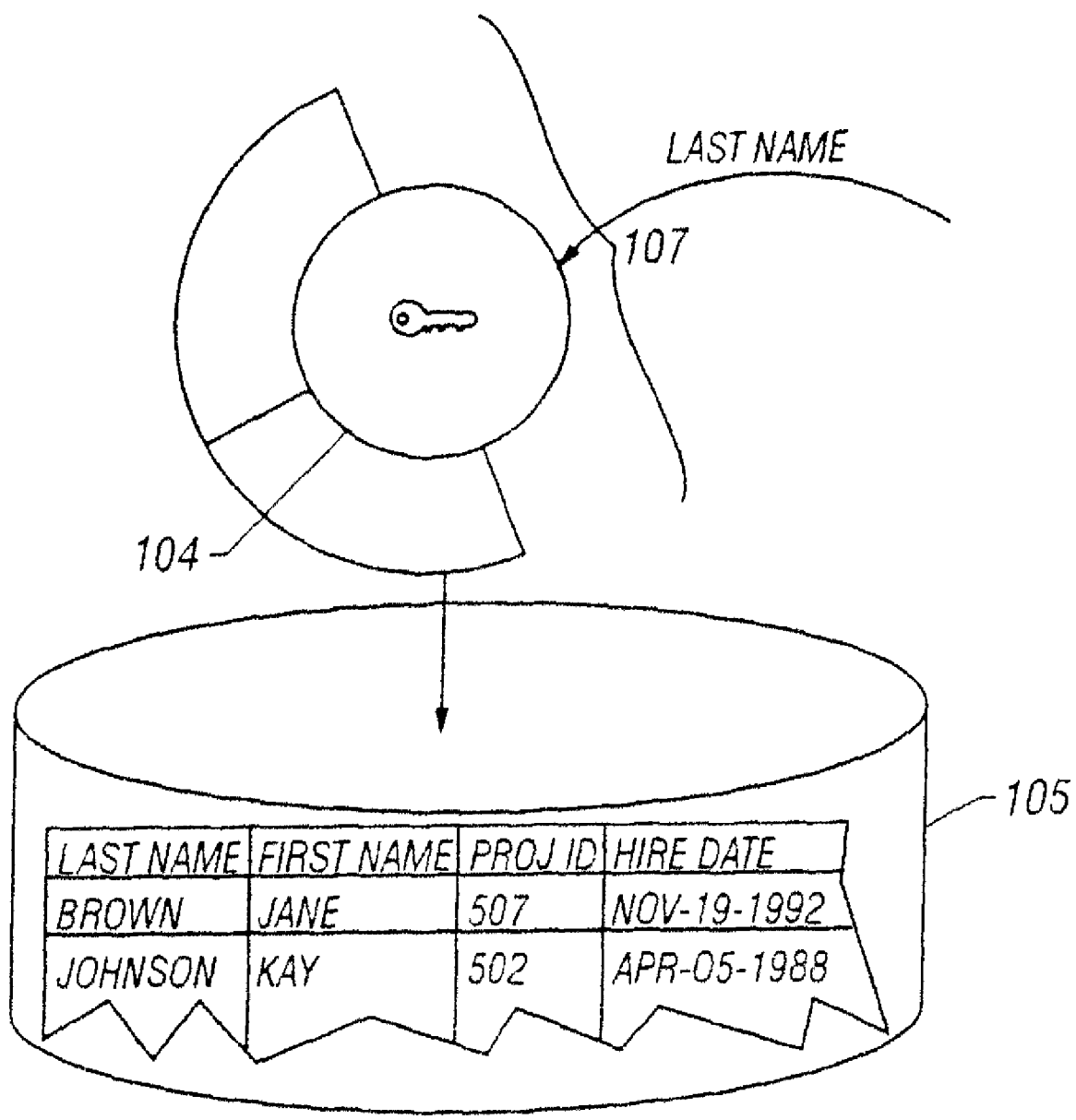
Figure 1C:
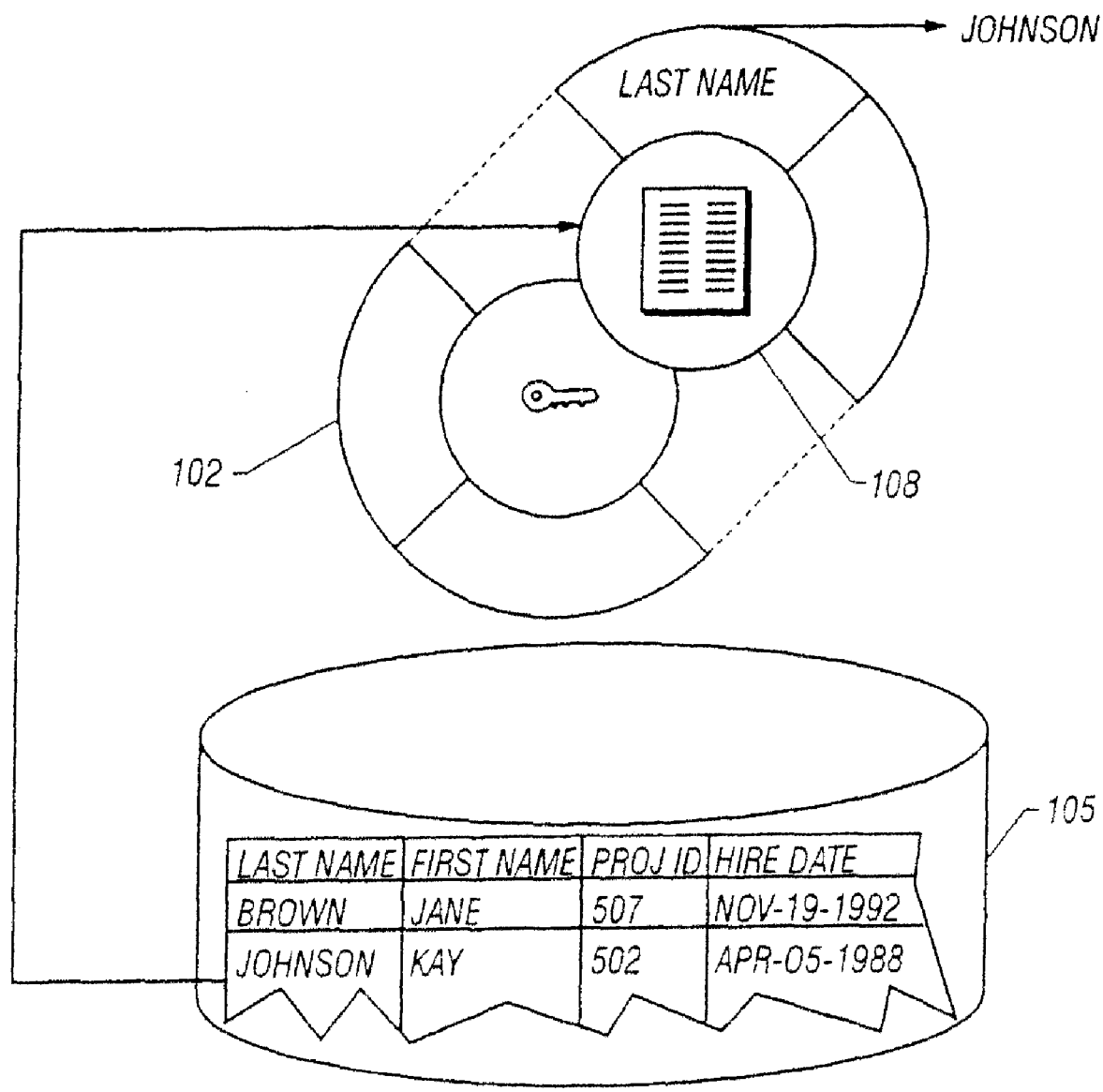

FIGS. 1A-1C illustrates this process. In FIG. 1A, an Employee object 101, labeled Jane Brown, is fetched from the database 105. Every employee has a manager, and Jane's is Kay Johnson. Instead of fetching Kay's data right away, a fault object 102 is created that contains the value of the foreign key 103 for Jane's toManager relationship (in this case the value is Kay's employee ID). The graphic for the fault object 102 has an empty center 104 with a key 103 in it, indicating that it contains no real values yet. The bottom half 106 of the object 102 shows the messages that the fault object can respond to without having to fetch its data, such as class, retain, and release. The other half of the object's outside is missing, however, showing a "tender area" 107 that a message such a lastName hits (in FIG. 1B). This causes the fault object 102 to fetch its data 108 from the database, overwrite its identity to become an Employee object, and invoke Employee's implementation of lastName, returning "Johnson" (in FIG. 1C).

The process of resolving an array fault is similar, except that many objects may be fetched instead of only one. Array faults may behave as instances of an Array class, and are triggered by any request for a member object or for the number of objects in the array (the number of objects for a to-many relationship can't be determined without actually fetching them all).

Fault Class Description

A fault object is an enterprise object (or an array of enterprise objects) whose data hasn't yet been fetched from the database. When the run time environment fetches an object that has relationships, it creates fault objects for the destinations of those relationships (unless, for to-one relationships, the corresponding objects have already been fetched and uniqued). By not fetching an object until the application actually needs it, unnecessary interaction with the database server is prevented.

A fault object can represent one object, in which case it's called a single-object fault, or it can represent an array of objects described by some qualifier, in which case it's called an array fault. To-one relationships result in single-object faults, while to-many relationships result in array faults. A single-object fault fetches and loads the real object over itself the first time a message is sent to it (with some exceptions, listed below). An array fault loads its objects as soon as any message is sent to it that requires accessing the contents of the array (objectAtIndex:, count, and so on).

In the preferred embodiment of the present invention, the object faultWithPrimaryKey:entity:databaseChannel:zone: class method creates a single-object fault, and the array faultWithQualifier:fetchOrder: databaseChannel:zone: class method creates an array fault.

As an alternative to allowing the run time environment create fault objects, an application can explicitly create fault objects. Explicit fault objects are created to avoid fetch conflicts, for example. An object creates fault objects for objects that do not do not have a pre-defined relationship with the object, for example. Further, an enterprise object can create a fault object to defer initialization of an actual object when a primary data communications channel will be busy. By creating a fault object, a valid pointer to the data in the data source is stored in a instance variable of the fault object. The pointer to the data can be used with the primary communications channel to fetch the data and instantiate an actual object to replace the fault object when the primary communications channel becomes available. By creating the fault object, a single communications channel can be used to fetch data from a data source. Without a fault object, an alternative data communications channel must be used to fetch an object's data.

Messages that Don't Cause Fetching

A fault object may respond to some messages as if it were the target object, without causing a fetch. In one embodiment of the present invention, the following instance methods neither cause a fault object to fetch nor betray the true identity of a fault object:
autorelease
class
conformsToProtocol:
description
isKindOfClass:
isMemberOfClass:
isProxy (returns NO)
printForDebugger:
release
respondsToSelector:
retain
retainCount
zone Forcing a Fault Object to Fetch A fault object can be forced to fetch by sending it a message that it can't handle as a fault. The messages listed above all work with generic run-time information and so don't cause fetching, but any message that accesses data (such as key-value coding methods or custom messages) causes the fault to fetch its data with its database channel. Fault objects also define the self message so that it always causes the fault to fetch; this provides a method that has no effect on a normal object, but that can be used to cause a fault object to fetch.

Instance Variables

In the preferred embodiment of the present invention, the class is a is defined, where is a is an instance variable of the fault object defined as a pointer to the instance's class structure.

Method Types

The following method types may be defined in the preferred embodiment of the present invention:
Creating a fault
+arrayFaultWithQualifier: fetchOrder: database Channel:zone:
+objectFaultwithPrimaryKey:entity: databaseChannel:zone:
Getting information about a fault
+clear fault
+databaseChannelForFault:
+entityForFault:
+fetchOrderForFault:
+is Fault:
+primaryKeyForFault:
+qualifierForFault:
+targetClassForFault:
Special instance methods
−description
−self
Class Methods The following class methods may be defined in the preferred embodiment of the present invention:
+(NSArray *)arrayFaultWithQualifier:(EOQualifier *)aQualifier
fetchOrder:(NSArray *)aFetchOrder
databaseChannel:(EObatabaseChannel *)aChannel
zone:(NSZone *)zone This method returns an array fault that will have aChannel fetch its objects according to aQualifier and aFetchOrder (an array of EOAttributeOrdering objects) when it's accessed for the first time. If aChannel is fetching when the array is accessed, a fetch conflict will result, with undefined results.

For more information, see also: +objectFaultWithPrimaryKey:entity: databaseChannel:zone.
clearFault:
+(void)clearFault:aFault This method turns aFault into a freshly initialized instance of the target class, and does not fetch data for the new instance. It also raises NSInvalidArgumentException if invoked with an object that isn't fault object.

For more information, see also: +targetClassForFault:.
databaseChannelForFault:
+(EODatabaseChannel *)databaseChannelForFault: aFault This method returns the particular database channel (EODatabaseChannel) that aFault was created with, or nil if aFault isn't a fault object.
entityForFault:
+(EOEntity *)entityForFault:aFault This method returns the entity that aFault was created with (or as determined by the qualifier for an array fault). Returns nil if aFault isn't a fault object.
fetchOrderForFault:
+(NSArray *)fetchOrderForFault:aFault This method returns the array of EOAttribute Ordering objects that aFault was created with, or nil if aFault isn't an array fault.
is Fault:
+(BOOL)isFault:anObject This method returns YES if anObject is a fault object, NO otherwise. This method may be used instead of is KindOfClass: to determine whether an object is in fact a fault object.
+objectFaultWithPrimaryKey:(NSDictionary *)aKey
entity:(EOEntity *)anEntity
databaseChannel:(EODatabaseChannel *)aChannel
zone:(NSZone *)zone This method returns a single-object fault for an enterprise object with the specified primary key and entity. When accessed, aChannel fetches the actual object for the fault, allocating it from zone. If aChannel is fetching when the fault attempts to fetch, a fetch conflict will result, with undefined results.

For more information, see also: +arrayFaultwithQualifier: fetchorder: databaseChannel:zone.
   primaryKeyForFaullt:
      +(NSDictionary *)primaryKeyForFault:aFault
This method returns the primary key for a single-object fault, nil for an array fault or non-fault object.
   qualifierForFault:
      +(EOQualifier *)qualifierForFault:aFault
This method returns the qualifier used to fetch the object or objects that aFault was created for. For a single-object fault this is the qualifier of the entity the fault was created with, plus the primary key specification. For an array fault this is simply the qualifier the fault was created with. Returns nil if fault isn't aFault object.

For more information, see also: –qualifier (EOEntity).
   targetClassForFault:
      +(Class)targetClassForFault:aFault
This method returns the class that will be instantiated when aFault is fetched. For a single-object fault the class is determined by the entity the fault was created with. For an array fault the class is NSMutableArray. Returns nil if aFault isn't a fault object.

For more information, see also: –entity (EOQualifier).

Instance Methods

The following instance methods may de defined in the preferred embodiment of the present invention:
   description
      (NSString *)description
This method returns a string object that represents the contents of the fault object, without causing it to fetch its data. A single-object fault's description contains the name of its entity and the value of its primary key. An array fault's description contains the qualifier used to fetch its objects.
   self
      –self
This method causes the fault object to fetch its data and return self. This message may be used to force a fault object to fetch its data immediately.

Uniquing

In marrying relational databases to object-oriented programming, one requirement is that a row in the database be associated with only one object in the application. Uniquing ensures that if an object already exists in memory, another instance of it isn't created when a row with the same primary key is fetched from the database. So, for example, if two employee objects have the same manager, a single instance of the manager objects reside in memory, and both employee objects refer to it. Uniquing of enterprise objects limits memory usage, prevents redundant storage, and creates confidence that an object interacted with represents the true state of its associated row as it was last fetched by an application.

Figure 2:
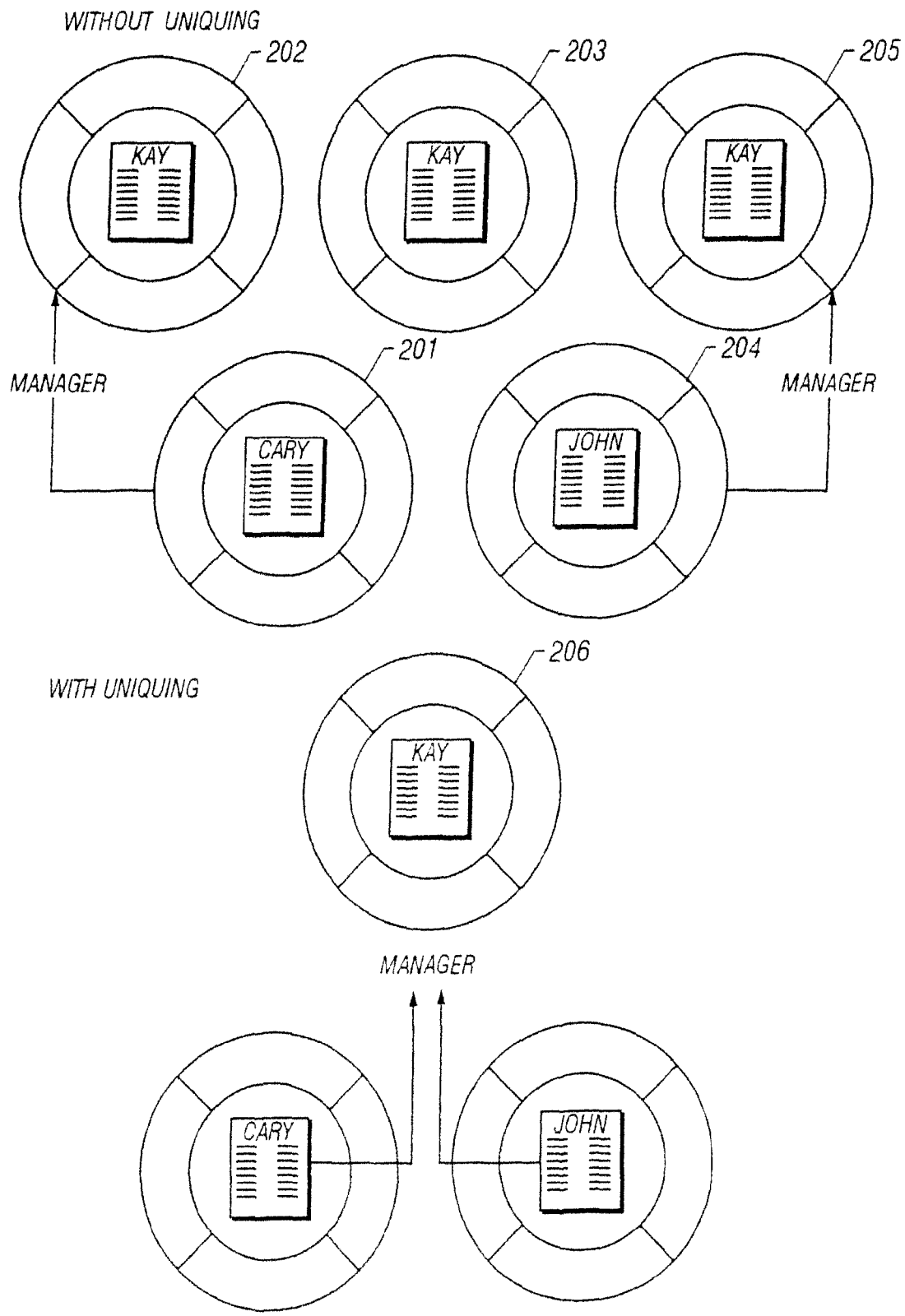
FIG. 2 is an illustration showing the concept of uniquing.

Without uniquing, a new enterprise object is created every time its corresponding row is fetched whether explicitly or through resolution of relationships. The top panel of FIG. 2 shows the enterprise objects that exist after fetching three employee objects without uniquing. Kay is Cary's and John's manager. On fetching an object 201 for Cary, an object 202 representing Kay is created to resolve the manager relationship. If an object 203 for Kay is then fetched, a separate object is created. Fetching an object 204 for John then causes yet another object 205 representing Kay to be created.

Kay's row in the database can be altered between any of these individual fetches, resulting in objects representing the same row, but with different data. Contrast this situation with the bottom panel, where uniquing results in only one object 206 ever being created for Kay. In this case, even though Kay's row can be changed, an application has a single view of Kay's data. The data may not reflect what's in the database if another use changes it, but there's no ambiguity within an application.

Uniquing and Fault Objects

When an object oriented relational database system that's configured to perform uniquing constructs a fault for a to-one relationship, it checks the primary key for the destination to see whether that object already exists. If so, it uses that object to immediately resolve the relationship. This preserves the uniqueness requirement for enterprise objects, in that there's never more than one id representing the same row in the database. Whether that id represents an actual enterprise object or a fault doesn't matter, since the data will be fetched when it's needed.

Similarly, if a database channel fetches data for an object that's already been created as a fault, the database channel turns the fault into an instance of its target class, without changing the id, and initializes the resulting enterprise object. The process is essentially the same whether you fetch the fault's data or whether the fault fetches the data itself upon being sent a message.

Models

In one embodiment of the present invention, the correspondence between an enterprise object class and stored data is established and maintained by using a model. A model defines, in entity-relationship terms, the mapping between enterprise object classes and a physical database. A model maps an enterprise object and its properties to an entity and the entity's attributes and relationships, which in turn map to the tables and columns in a database.

While a model can be generated at run time, another approach is to use a Modeler application to create models that can be stored as files and added to a project. Creating a model is typically the first step in writing an application. A model may be used throughout the development and deployment of an application to maintain the mapping between enterprise objects and persistent data.

In addition to storing a mapping between the database schema and enterprise objects, a model file stores information needed to connect to the database server. This connection information includes the name of an adaptor bundle to load so that an application can communicate with the database at run time.

Delayed Object Initialization

As previously described, a stand-in object is created to resolve a relationship associated with an actual object when the actual object is instantiated A stand-in object can also be used at any time during execution of an application to delay the initialization of an actual object.

For example, in an stock portfolio application, a stock object may be created using data from a data source. The application may have a second object class, a company object class, to handle company information. When the stock object is created, a fault object can be created to establish a pointer that points to the company data that is associated with the stock data. The pointer can be used at a later time to initialize the company object. The company data can be fetched from the same data source as the stock information, or from a different data source. For example, the stock information may be obtained from a on-line service and the company information is available from a local database.

Thus, a relationship with another object or a link to related data may, for example, cause a reference to an object during runtime prior to the time that the object is actually needed. This initial reference may not require that the object be fully instantiated at the time of the reference. That is, it may not be necessary to initialize the object with fetched data at the time of the first reference, for example. If the actual object is completely instantiated at the time of the initial reference, a needless fetch operation may be performed to initialize the object with data from a data source.

To avoid such a needless operation, a stand-in object is created upon this initial reference instead of the actual object. The stand-in object is not initialized with data from the data source. Instead, a pointer is created that points to the data to be used to initialize the actual object. This pointer to the data is stored in an instance variable of the stand-in object, for example. When the actual object is needed, the pointer is used to perform the fetch operation to complete the object's instantiation.

Figure 3A:
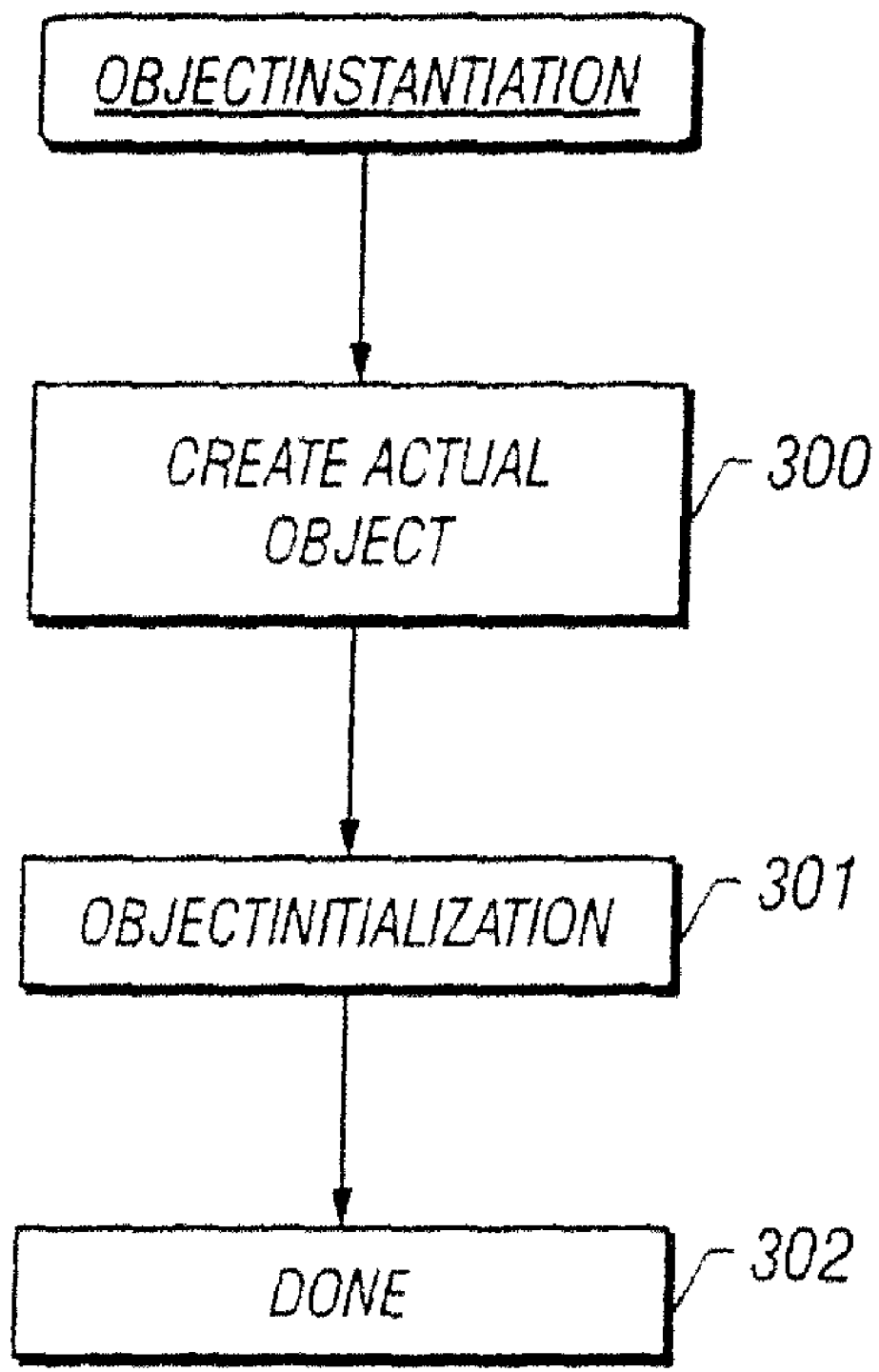
FIGS. 3A-3D are flow diagrams illustrating the method of the present invention.
Figure 3B:
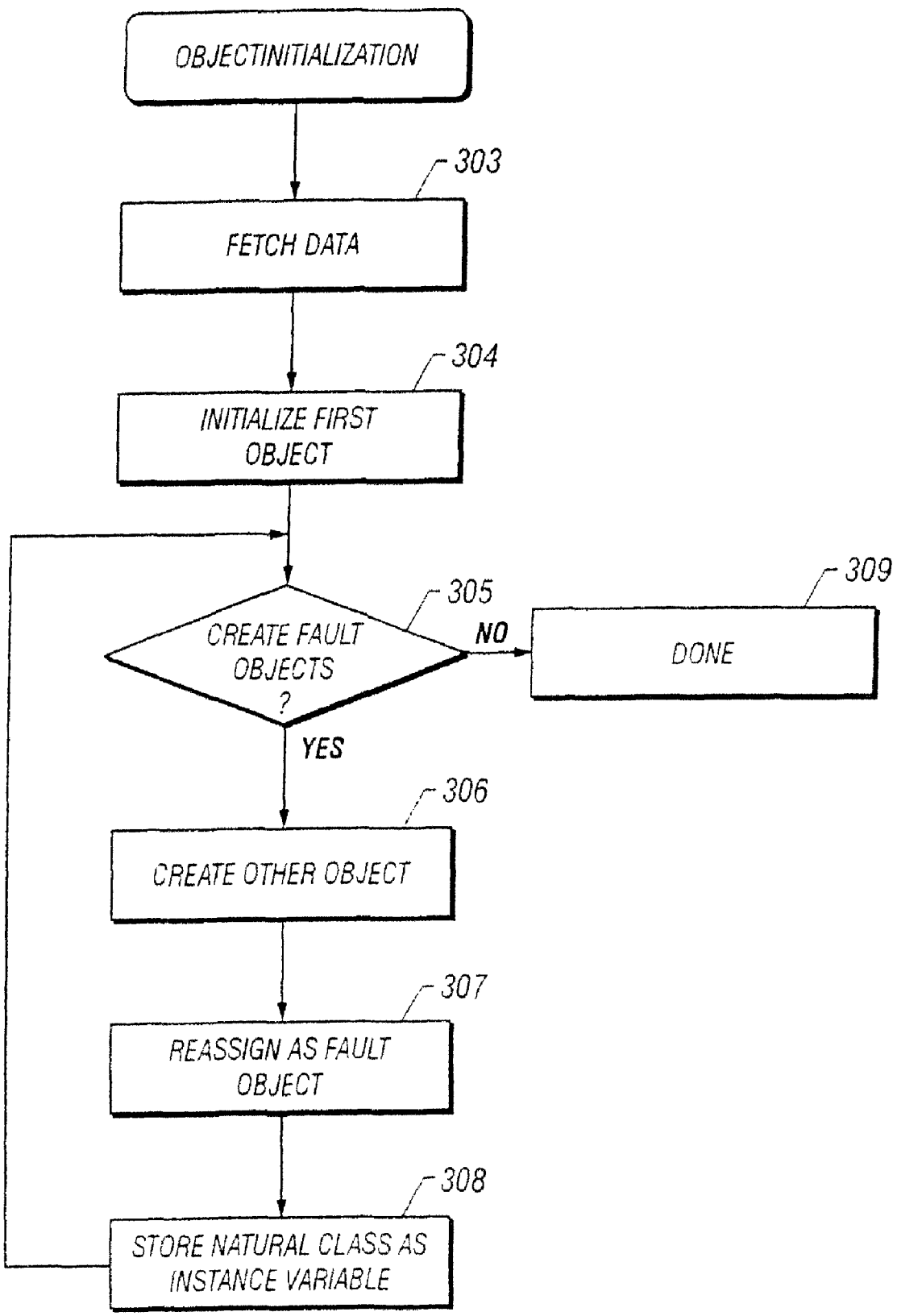

One example of the process of instantiating an actual object and the creation of stand-in objects is illustrated in FIGS. 3A-3B. The process flow provided in FIGS. 3A-3B is used to create an actual object, and create stand-in fault objects. A fault object can be used to delay the creation of an actual object.

The instantiation of an actual object is illustrated in FIG. 3A, At step 300, an actual object is created. At step 301, objectInitialization is invoked to fetch data from a data source and initialize the actual object. At step 302, processing is completed.

To fully instantiate an actual object, the instance variables of the actual object are initialized with data fetched from a data source. This process is illustrated in FIG. 3B. At step 303, the data for the actual object is fetched from the database. This data is used to initialize the actual object at step 304. At step 305, a determination is made whether any stand-in objects should be created. A stand-in object is created when, for example, the actual object has a relationship with another object. A stand-in object can also created at any time during execution. If there is no need to create a stand-in fault object, the process ends at step 309.

If a stand-in object is needed, processing continues at step 306. At step 306, another object is created. At step 307, the new object is reassigned as a fault object. The new object is reassigned as a fault object by, for example, reassigning the is a pointer of the new object to point to the fault class. In Objective C, the is a pointer is an instance variable in every object that points to the description of the class. The is a pointer may reside in the first four bytes of memory for the object. In one embodiment of the present invention, the is a pointer is reassigned so that it points to the Fault class. At step 308, the natural (i.e., actual) class of the fault object is stored as an instance variable of the newly-created fault object. Processing continues at step 305 to determine whether any additional stand-in fault objects should be created. If it is determined at step 305 that no fault objects remain to be created, processing ends at step 309.

Figure 3C:
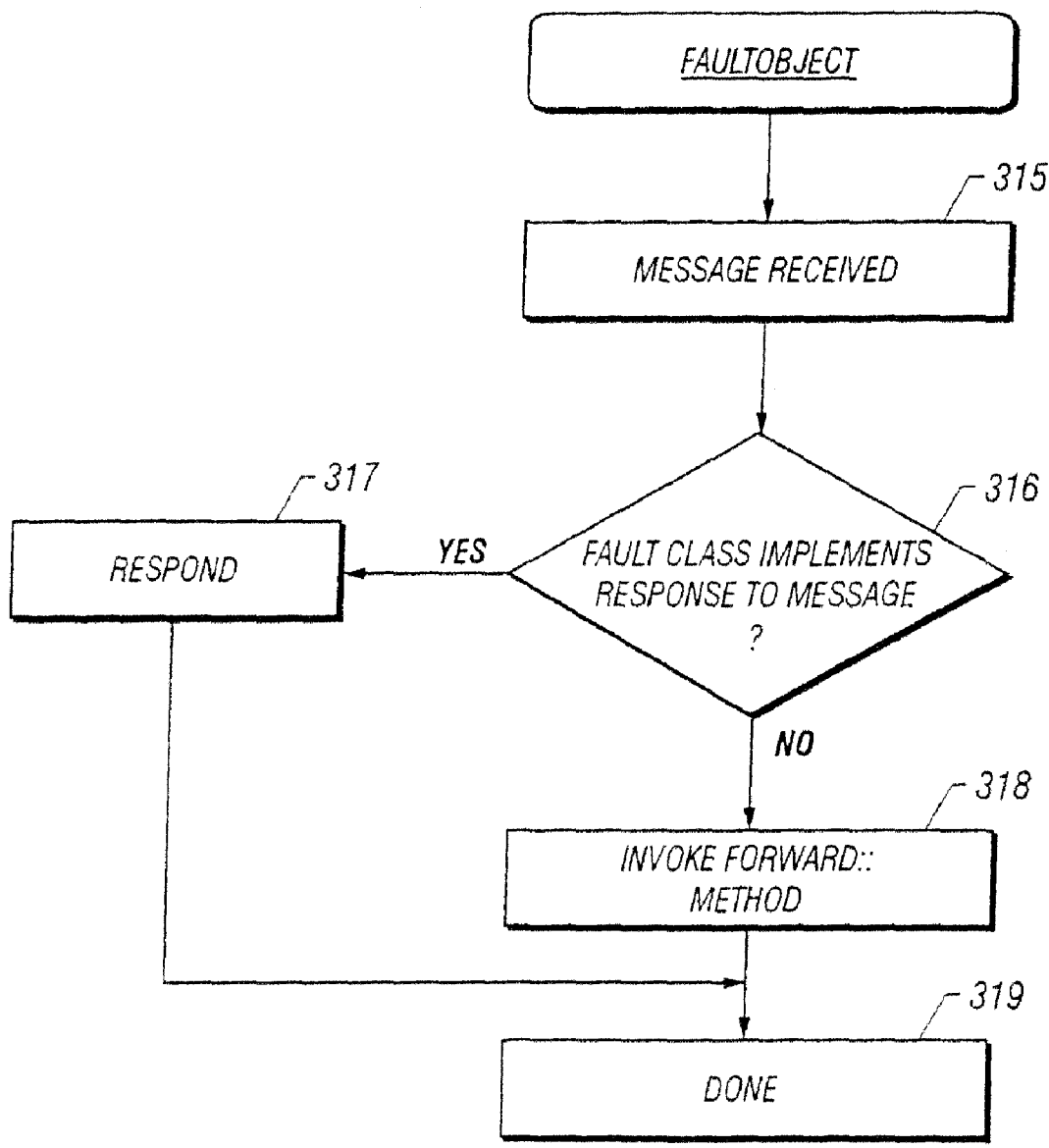

Once a stand-in fault object is created, it can receive messages (e.g., from other objects). An actual object replaces the fault object when the fault object can not respond to a message that is received by the fault object. FIG. 3C provides a faultObject process flow to illustrate this process. At step 315, the stand-in fault object receives a message. At step 316, a determination is made whether or not the fault object implements the response to the message. If it does, processing continues at 317 to invoke the response, and processing ends at 319.

If it is determined at step 316, that the stand-in fault object does not implement a response to the message, processing continues at block 318 to invoke the forward:: method. Processing ends at block 319.

When it is determined that a stand-in fault object does not implement a response to the message, it is assumed that the message was intended for the object for which the fault object is a stand-in. Thus, the actual object is now needed. In the preferred embodiment, the fault object becomes the actual object. When the fault object is first created, the natural class of the actual object for which the fault object is a stand-in is stored in an instance variable of the fault object. The object's is a pointer is modified to point to a Fault class. When the actual object is required, the is a pointer is reassigned back to the object's natural class.

Figure 3D:
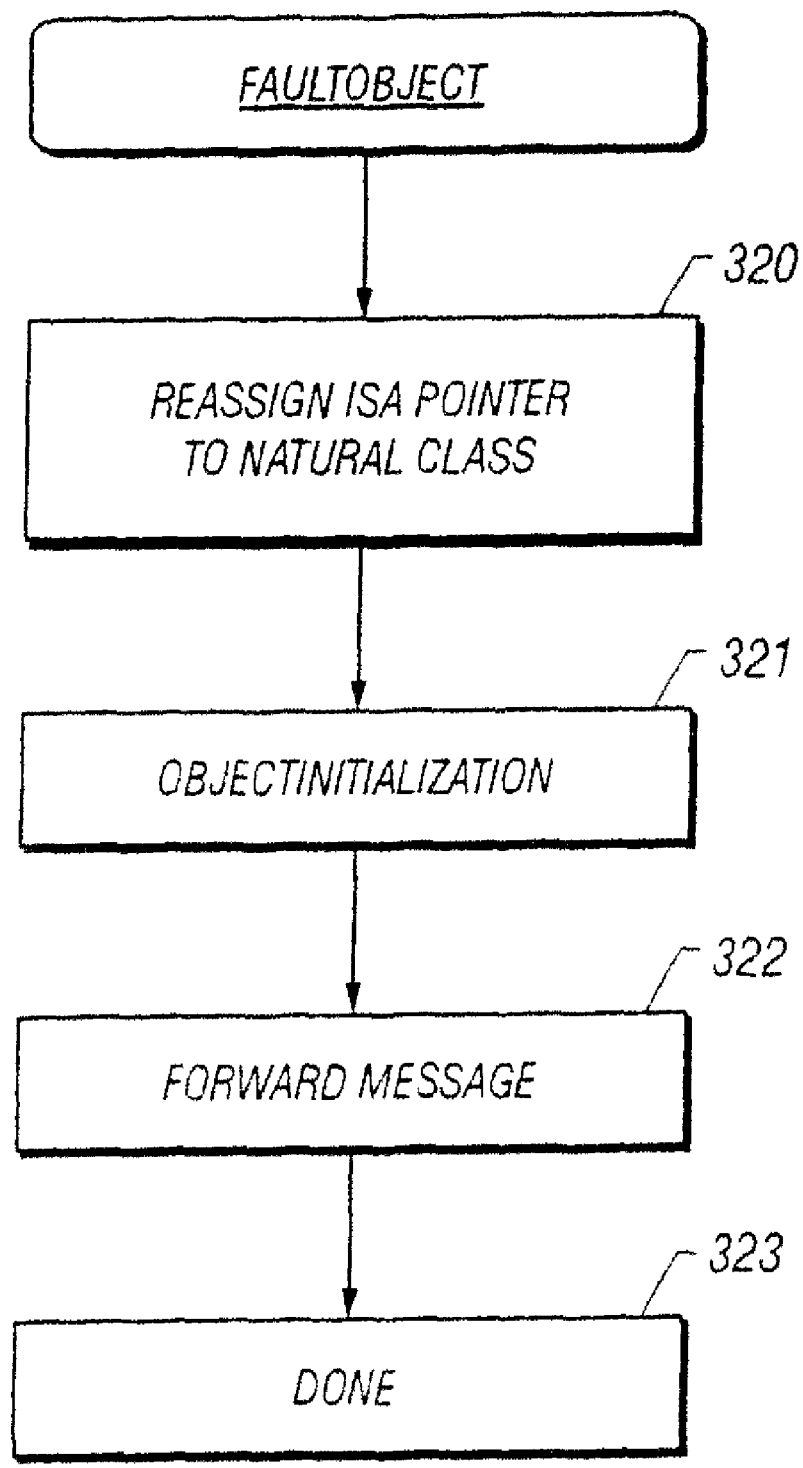

The forward:: method invoked at step 318 of FIG. 3C transforms the stand-in fault object to its natural class, completes the objects instantiation, and forwards the message to the object. FIG. 3D provides a process flow of the forward:: method. At step 320 the is a pointer is reassigned to the natural class.

In addition to storing the is a pointer so that it points to the fault class, other information is stored that is used to fetch the original object. For example, the particular database where the actual data resides, any keys that are required to fetch the data, etc., are included with the fault object. When the fault object receives a message it doesn't recognize, this stored information is used to determine how to locate and use the external data storage to retrieve the original data.

At step 321, the objectInitialization process flow is invoked to retrieve the original data from the data source, initialize the actual object, and create any fault stand-in objects for the new actual object.

At step 322, the message that received at 315 is forwarded to the new, actual object. Further messages to the target object are responded to by the fully functional object. Processing ends at step 323.

The present invention may be used not only to delay fetching data from a database, but also in any application where delayed retrieval from a data source is preferred, such as from a user or a newsfeed, or any source where the costs to retrieve are expensive.

Statically Bound Language Environment

The implementation of the present invention is preferably used in an object oriented programming system having the ability to catch messages that are not recognized by a receiver object whenever that particular method is not implemented on that class. However, the present invention can be used in a statically bound environment such as C++. In a C++ environment, an object's class can be modified to a fault class by replacing the actual object's pointer to its function vector to point to an a array of function pointers that points to an implementation of the forward:: method. At that point, the actual object can be fully instantiated, the function vector pointer can be updated to point to the actual object's function vector pointer, and the message can then be responded to by the actual object. Thus, the present invention can be implemented in a statically bound language that uses method dispatch via indirection through a block of function pointers such as C++.

Thus, a method for providing stand-in objects is described.

The invention claimed is:

1. A method for managing object relationships comprising:
using a processor to instantiate a first object having a relationship with a second object; and
using the processor to create a fault object to stand in place of said second object with respect to said relationship;

wherein the fault object is configured to transform itself into or replace itself with the second object in the event a message to which the fault object is not configured to respond in a same manner as the second object is received.

2. A method as recited in claim 1, further comprising associating said first object with said fault object.

3. A method as recited in claim 1, further comprising associating said fault object with said relationship of the first object with the second object.

4. A method as recited in claim 1, wherein the message invokes a method of the second object which the fault object is not configured to perform.

5. A method as recited in claim 1, wherein the message invokes a method that requires a data that the fault object is not configured to retrieve or store.

6. A method as recited in claim 1, wherein the fault object is configured to appear to the first object in at least one respect to be the same as the second object at least in part by being configured to respond to a second message received from the first object in a same manner in which the second object would respond to the second message.

7. A method as recited in claim 1, wherein the fault object is further configured to:
determine based at least in part on the message that the second object is needed; and
transform itself into the second object, in response to the determination that the second object is needed.

8. A method as recited in claim 7, wherein the fault object is configured to transform itself into the second object at least in part by retrieving from a data source a data associated with the second object.

9. A method as recited in claim 8, wherein the data is stored in a data source that comprises one or more of the following: a database; an object-oriented database; a user interface; and a file system.

10. A method as recited in claim 7, wherein the fault object is configured to transform itself into the second object at least in part by rewriting an attribute of the fault object to a value associated with the second object.

11. A method as recited in claim 10, wherein the value comprises a pointer or other identifier associated with a class description.

12. A method as recited in claim 1, wherein an actual class of which the second object is an instance is stored as an instance variable of the fault object.

13. A non-transitory computer readable storage medium comprising computer instructions, which when executed by a computer cause the computer to perform the steps of:
instantiating a first object having a relationship with a second object; and
creating a fault object to stand in place of said second object with respect to said relationship; wherein the fault object is configured to transform itself into or replace itself with the second object in the event a message to which the fault object is not configured to respond in a same manner as the second object is received.

14. A non-transitory computer readable storage medium as recited in claim 13, wherein the fault object is configured to transform itself into or replace itself with the second object in the event an indication is received that a method associated with the data has been invoked.

15. A non-transitory computer readable storage medium as recited in claim 13, wherein the fault object is configured to appear to the first object in at least one respect to be the same as the second object at least in part by being configured to respond to a message received from the first object in a same manner in which the second object would respond to the message.

16. A non-transitory computer readable storage medium as recited in claim 13, wherein an actual class of which the second object is an instance is stored as an instance variable of the fault object.

17. A computer system, comprising:
a memory configured to store a first object having a relationship with a second object; and
a processor coupled to the memory and configured to create in said memory a fault object to stand in place of said second object with respect to said relationship; wherein the fault object is configured to transform itself into or replace itself with the second object in the event a message to which the fault object is not configured to respond in a same manner as the second object is received.

18. A computer system as recited in claim 17, wherein the message is received from the first object.

19. A computer system as recited in claim 17, wherein the message invokes a method of the second object which the fault object is not configured to perform.

20. A computer system as recited in claim 17, wherein responding to the message requires a data associated with the second object which is not available to the fault object.

* * * * *